US012739758B2

(12) United States Patent
Zhang et al.

(10) Patent No.: US 12,739,758 B2
(45) Date of Patent: Sep. 15, 2026

(54) SYSTEM AND METHOD FOR POWER HEADROOM REPORTING FOR UPLINK TRANSMISSION IN SINGLE DCI BASED MULTI-TRP OPERATION

(71) Applicant: ZTE CORPORATION, Shenzhen (CN)

(72) Inventors: Yang Zhang, Shenzhen (CN); Chuangxin Jiang, Shenzhen (CN); Ke Yao, Shenzhen (CN); Bo Gao, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 422 days.

(21) Appl. No.: 18/208,041

(22) Filed: Jun. 9, 2023

(65) Prior Publication Data

US 2023/0413190 A1 Dec. 21, 2023

Related U.S. Application Data

(63) Continuation of application No. PCT/CN2021/084896, filed on Apr. 1, 2021.

(51) Int. Cl.

| | |
|---|---|
| ***H04W 52/36*** | (2009.01) |
| ***H04L 5/00*** | (2006.01) |
| ***H04W 72/23*** | (2023.01) |

(52) U.S. Cl.

CPC ......... *H04W 52/365* (2013.01); *H04L 5/0051* (2013.01); *H04W 72/23* (2023.01)

(58) Field of Classification Search

CPC .. H04L 5/0051; H04W 52/365; H04W 52/42; H04W 72/23

See application file for complete search history.

(56) References Cited

U.S. PATENT DOCUMENTS

| | | | | |
|---|---|---|---|---|
| 10,945,122 | B2 | 3/2021 | Gunnarsson et al. | |
| 2007/0002806 | A1 | 1/2007 | Soomro | |
| 2013/0070611 | A1* | 3/2013 | Ahn | H04W 52/286 370/328 |
| 2016/0278124 | A1* | 9/2016 | Zhao | H04W 74/08 |
| 2016/0330698 | A1* | 11/2016 | Loehr | H04W 52/241 |

(Continued)

FOREIGN PATENT DOCUMENTS

| | | | |
|---|---|---|---|
| CN | 103781111 | A | 5/2014 |
| CN | 104980888 | A | 10/2015 |

(Continued)

OTHER PUBLICATIONS

Extended European Search Report for EP Appl. No. 21932271.6, dated Dec. 7, 2023 (8 pages).

(Continued)

*Primary Examiner* — Kashif Siddiqui

(74) *Attorney, Agent, or Firm* — Foley & Lardner LLP

(57) ABSTRACT

A system and method for wireless communication are disclosed herein. One embodiment includes a wireless communication device receiving, from a wireless communication node, a first radio resource control (RRC) signalling configuring a plurality of power headroom reporting (PHR) parameters for uplink transmission; wherein one or more of the plurality of PHR parameters are specifically associated with a first one of a plurality of sounding reference signal (SRS) resource sets.

19 Claims, 12 Drawing Sheets

(56) References Cited

U.S. PATENT DOCUMENTS

2016/0366631 A1 12/2016 Crisci et al.
2019/0253986 A1 8/2019 Jeon et al.
2019/0335477 A1* 10/2019 Nam ................... H04W 72/542
2019/0363843 A1 11/2019 Gordaychik
2020/0229130 A1 7/2020 Keating et al.
2020/0264261 A1 8/2020 Akkarakaran et al.
2020/0296736 A1* 9/2020 Yokomakura ......... H04L 5/0051
2021/0037481 A1 2/2021 Kim et al.
2021/0045070 A1* 2/2021 Yi ..................... H04W 72/0446
2021/0099832 A1 4/2021 Duan et al.
2021/0160917 A1* 5/2021 Goto ................. H04W 72/1263
2021/0360577 A1 11/2021 Manolakos et al.
2021/0360594 A1* 11/2021 Park .................. H04B 7/06952
2021/0377698 A1 12/2021 Manolakos et al.
2021/0400734 A1 12/2021 Zhang et al.
2022/0030543 A1 1/2022 Yerramalli et al.
2022/0103976 A1 3/2022 Gummadi et al.
2022/0116902 A1* 4/2022 Liu ....................... H04W 4/029
2022/0120842 A1 4/2022 Edge et al.
2022/0201531 A1 6/2022 Huang et al.
2023/0379860 A1 11/2023 Rao et al.
2024/0015762 A1 1/2024 Yerramalli et al.
2024/0179789 A1 5/2024 Shah et al.

FOREIGN PATENT DOCUMENTS

CN 109391996 A 2/2019
WO WO-2018/203819 A1 11/2018
WO WO-2020/140668 A1 7/2020
WO WO-2020/146739 A1 7/2020
WO WO-2020/168573 A1 8/2020
WO WO-2020/197829 A1 10/2020
WO WO-2020/231307 A1 11/2020
WO WO-2021/032280 A1 2/2021
WO WO-2021/196099 A1 10/2021

OTHER PUBLICATIONS

Moderator (Catt), "FL Summary #2 for accuracy improvements by mitigating UE Rx/Tx and/or gNB Rx/Tx timing delays", 3GPP TSG RAN WG1 Meeting #104-e, R1-2101951, Feb. 5, 2021, e-Meeting (57 pages).
Non-Final Office Action on U.S. Appl. No. 17/873,937 DTD Sep. 5, 2024.
Office Action for KR Appl. No. 10-2022-7026436, dated Oct. 24, 2024 (with English translation, 8 pages).
Ad-Hoc Chair (Samsung), "Session notes for 8.1 (Further enhancements on MIMO for NR)", 3GPP TSG RAN WG1 Meeting #104-e, R1-2102191, Feb. 5, 2021, e-Meeting (20 pages).
Ad-Hoc Chair (Samsung), "Session notes for 8.1 (Further enhancements on MIMO for NR)", 3GPP TSG RAN WG1 Meeting #104-e, R1-2102250, Feb. 5, 2021, e-Meeting (20 pages).
Apple Inc., "On Multi-TRP Reliability Enhancement", 3GPP TSG-RAN WG1 Meeting #104-e, R1-2101351, Feb. 5, 2021, e-Meeting (12 pages).
Moderator (Nokia), "Summary #2 of Multi-TRP for PUCCH and PUSCH", 3GPP TSG RAN WG1 #104-e, R1-2101900, Feb. 5, 2021, e-Meeting (90 pages).
Moderator (Nokia), "Summary #3 of Multi-TRP for PUCCH and PUSCH", 3GPP TSG RAN WG1 #104-e, R1-2102060, Feb. 5, 2021, e-Meeting (44 pages).
Qualcomm Incorporated, "Enhancements on Multi-TRP for PDCCH, PUCCH and PUSCH", 3GPP TSG-RAN WG1 Meeting #104-e, R1-2101447, Feb. 5, 2021, e-Meeting (28 pages).
Vivo, "Further discussion on multi beam enhancement", 3GPP TSG RAN WG1 #104-e, R1-2100421, Feb. 5, 2021, e-Meeting (29 pages).
Ericssom, "Summary of RAT dependent positioning methods in 7.2.10.3 at RAN1#95," 3GPP TSG-RAN WG1 #95, R1-1814005, Nov. 16, 2018, Spokane, United States (8 pages).
Extended European Search Report for EP Appl. No. 21920148.0, dated Dec. 13, 2022 (9 pages).
Huawei et al.: "TS 23.501: Location report procedure for UE in RRC inactive mode" SA WG2 Meeting #122Bis; S2-175848; Aug. 25, 2017; Sophia Antipolis, France (5 pages).
International Search Report and Written Opinion for PCT Appl. No. PCT/CN2021/083325, mailed Dec. 30, 2021 (6 pages).
International Search Report and Written Opinion for PCT Appl. No. PCT/CN2021/084316, mailed Dec. 30, 2021 (8 pages).
International Search Report and Written Opinion for PCT Appl. No. PCT/CN2021/084896, mailed Jan. 4, 2022 (8 pages).
ZTE, "On NR PHR calculation," 3GPP TSG RAN WG1 Meeting #90, R1-1712313, Aug. 25, 2017, Prague, Czechia (6 pages).
Final Office Action on U.S. Appl. No. 17/873,937 DTD Dec. 30, 2024.
Non-Final Office Action on U.S. Appl. No. 17/873,937 DTD Apr. 22, 2025.
Notice of Allowance on U.S. Appl. No. 17/873,937 DTD Sep. 10, 2025.
Notice of Final Rejection for KR Appl. No. 10-2022-7026436, dated Aug. 18, 2025 (with English translation, 6 pages).
Notice of Final Rejection for KR Appl. No. 10-2022-7026436, dated Jun. 11, 2025 (with English translation, 5 pages).
Non-Final Office Action on U.S. Appl. No. 18/200,723 DTD Jan. 9, 2026.
Huawei, et al., "High layer impacts on SRS Carrier Based Switching for Lte", 3GPP TSG-RAN2 Meeting #95bis, R2-166632, Kaohsiung, Oct. 1, 2016 (6 pages).
Office Action for KR Appl. No. 10-2023-7019489, dated Apr. 17, 2026 (with English translation, 9 pages).
Qualcomm Incorporated, "Periodic SRS in SCell dormant Bwp", 3GPP TSG RAN WG2 #112-E, R2- 2010128, e-Conference, Oct. 23, 2020 (55 pages).

* cited by examiner

Receive RRC signalling configuring PHR parameters for UL transmission
602

Transmit RRC signalling that configures PHR parameters for UL transmission
702

800

SYSTEM AND METHOD FOR POWER HEADROOM REPORTING FOR UPLINK TRANSMISSION IN SINGLE DCI BASED MULTI-TRP OPERATION

CROSS-REFERENCE TO RELATED APPLICATION

This application claims the benefit of priority under 35 U.S.C. § 120 as a continuation of PCT Patent Application No. PCT/CN2021/084896, filed on Apr. 1, 2021, the disclosure of which is incorporated herein by reference in its entirety.

TECHNICAL FIELD

The disclosure relates generally to wireless communications and, more particularly, to systems and methods for power headroom reporting for uplink transmission in single DCI based multi-TRP operation.

BACKGROUND

Joint transmission or reception is the transmission or reception of multiple signals from multiple sites transmitted or received at the same time. Joint transmission or reception of Multiple Transmission and Reception Point (Multi-TRP) plays a significant role in increasing the throughput of wireless communication. Both Long Term Evolution-Advanced (LTE-A) and New Radio Access Technology (NR) support multi-transmission receiving node transmission.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

In one implementation, a method performed by a wireless communication device includes receiving, by a wireless communication device from a wireless communication node, a first radio resource control (RRC) signalling configuring a plurality of power headroom reporting (PHR) parameters for uplink transmission; wherein one or more of the plurality of PHR parameters are specifically associated with a first one of a plurality of sounding reference signal (SRS) resource sets.

In another implementation, the uplink transmission includes at least one of: physical uplink shared channel (PUSCH) transmission, PUSCH repetition, or PUSCH occasion.

In one implementation, a method performed by a wireless communication node includes transmitting, by a wireless communication node to a wireless communication device, a first radio resource control (RRC) signalling configuring a plurality of power headroom reporting (PHR) parameters for uplink transmission; wherein one or more of the plurality of PHR parameters are specifically associated with a first one of a plurality of sounding reference signal (SRS) resource sets.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE IMPLEMENTATIONS

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
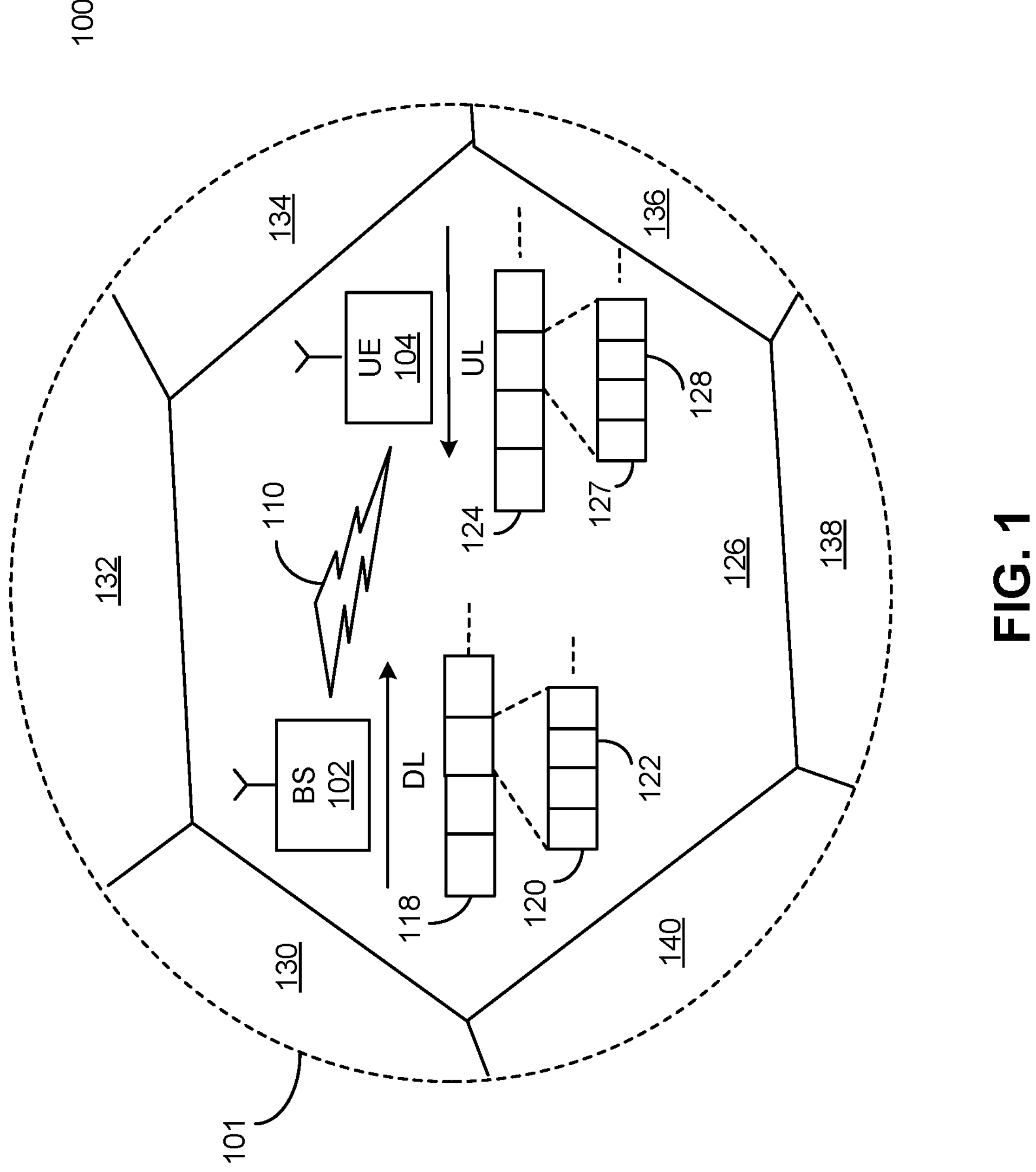
FIG. 1 illustrates an example cellular communication network in which techniques and other aspects disclosed herein may be implemented, in accordance with an implementation of the present disclosure.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
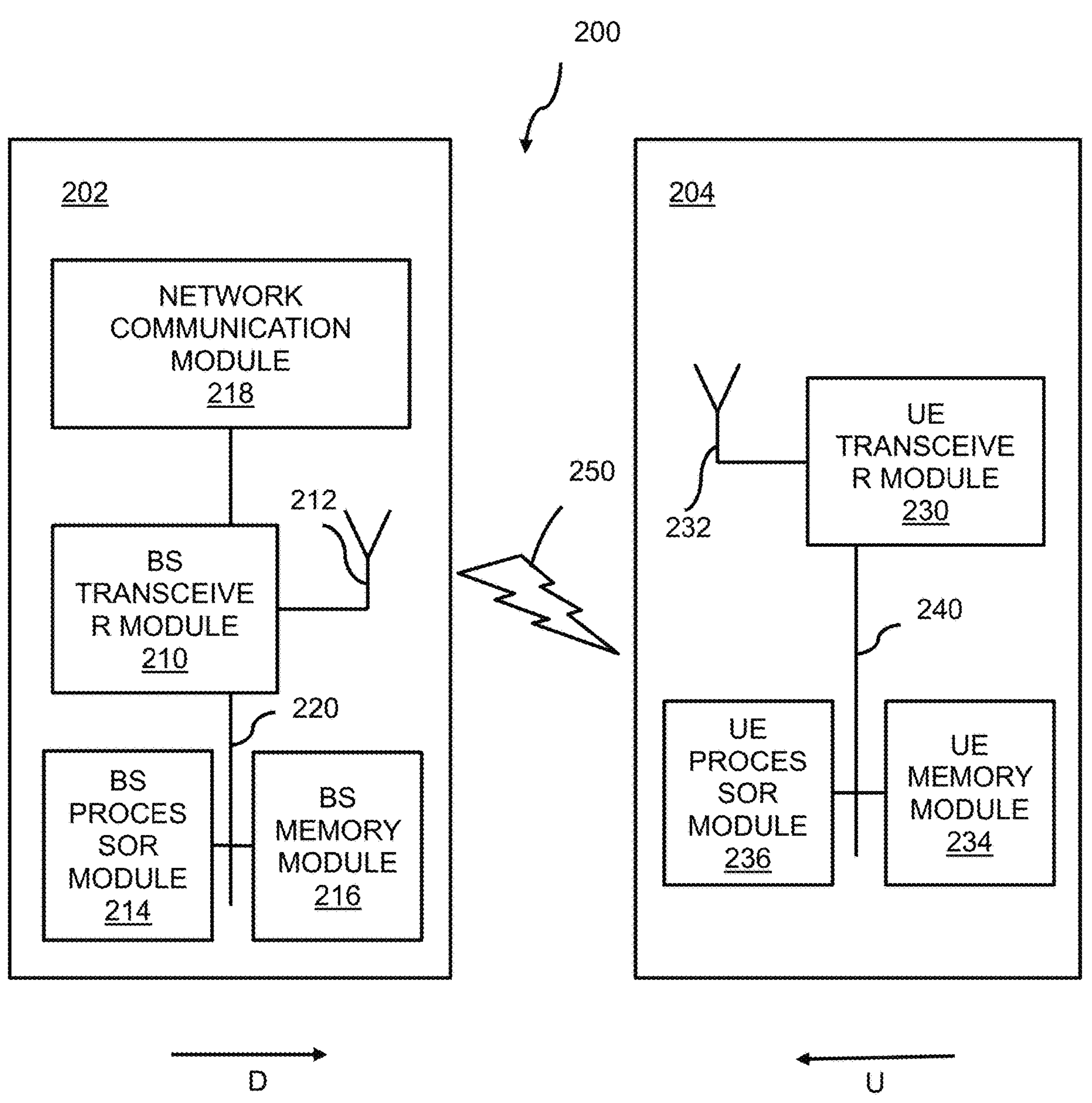
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the BS transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the BS transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the BS transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

New Radio technology (NR) is a new radio access technology developed by 3$^{rd}$ Generation Partnership Project (3GPP) as a standard for air interfaces in radio networks. Available frequencies for use in NR systems include a first frequency range (FR1) and a second frequency range (FR2). Frequencies in FR1 include sub-6GHz frequencies and frequencies in FR2 include frequencies in the millimeter wavelength range (e.g., over 6GHz).

5G NR includes multiple input multiple output (MIMO) features that facilitate utilizing a large number of antenna elements at a BS for both FR1 and FR2. One MIMO feature is support for multi-TRP operation. In operation, multi-TRPs transmit data to the UE to improve transmission performance. In 5G NR, Physical Uplink Shared Channel (PUSCH) repetition is supported using single-TRP. However, single-TRP may reduce the reliability of a communications system. For example, in FR2, when a link between a UE and a TRP is affected by blockage, the reliability of the PUSCH repetition based on single-TRP reduces. ABS may use multiple TRPs to transmit data to the UE to improve transmission performance. The robustness and reliability for PUSCH transmission may be improved by single downlink control information (DCI) based multi-TRP PUSCH repetition.

Figure 3:
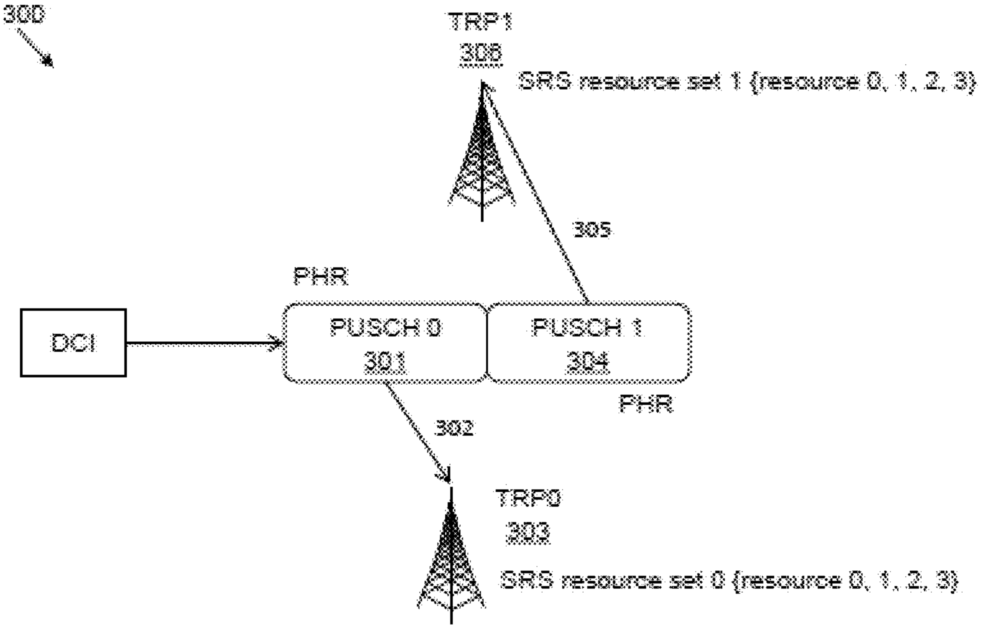
FIG. 3 illustrates a block diagram of single DCI based multi-TRP PUSCH operation, in accordance with some implementations of the present disclosure.

FIG. 3 illustrates a block diagram 300 of single DCI based multi-TRP PUSCH operation, in accordance with some implementations of the present disclosure. As shown, a first PUSCH 301 (PUSCH0) is transmitted 302 to a first TRP 303 (TRP0), and a second PUSCH 304 (PUSCH1) is transmitted 305 to a second TRP 306 (TRP1). The first PUSCH 302 transmission may use a first sounding reference signal resource set (SRS) (e.g., SRS set 0 with resources 0, 1, 2, 3), and the second PUSCH 305 transmission may use a second SRS set (e.g., SRS set 1 with resources 0, 1, 2, 3).

PUSCH transmission sets (e.g., PUSCH 301 and PUSCH 304) may be distinguished in various ways including: (1) the first PUSCH transmission set PUSCH 301 may be associated with a first SRS resource set using non-codebook based transmission, while the second PUSCH transmission set PUSCH 304 may be associated with another SRS resource set using non-codebook based transmission (2) the first PUSCH transmission set PUSCH 301 may correspond to a first transmission occasion, while the second PUSCH transmission PUSCH 304 may correspond to a second transmission occasion (3) the first PUSCH transmission set PUSCH 301 may correspond to a first frequency hop, and the second PUSCH transmission set PUSCH 304 may correspond to a second frequency hop (4) the first PUSCH transmission set PUSCH 301 may include a first half of a set of PUSCH transmissions, while the second PUSCH transmission set PUSCH 304 may include a second half of the set of PUSCH transmissions (5) the first PUSCH transmission set PUSCH 301 may include PUSCH transmissions in a set of PUSCH transmissions with an odd order, while the second PUSCH transmission set PUSCH 304 may include PUSCH transmissions in the set of PUSCH transmissions with an even order (6) the first PUSCH transmission set PUSCH 301 may include a number of PUSCH transmissions (e.g., a first, second, fifth and sixth PUSCH transmission), while the second PUSCH transmission set PUSCH 304 may include other PUSCH transmissions (e.g., a third, fourth, seventh, and eighth PUSCH transmission).

The single DCI based multi-TRP PUSCH transmission may be configured such that several (e.g. two) SRS resource sets are configured with the same higher layer parameter usage in SRS-ResourceSet set to 'codebook' or 'nonCodebook'. Several (e.g. two) SRS Resource Indicator (SRI) indications in a DCI field may be used for SRS resource indication of the various SRS resource sets. In some configurations, the transmission rank and the number of SRS port(s) may be the same for each codebook based or non-codebook based PUSCH transmission. A UE may transmit uplink (UL) data according to a codebook based or non-codebook based PUSCH transmission.

Due to different channel conditions of links between the UE and multiple TRPs (e.g., TRP0 303 and TRP1 306), it may be beneficial for information in each of the PUSCH (e.g., PUSCH 301 and PUSCH 304) to be TRP specific. For example, the power headroom report (PHR) may be specific for each TRP. PHR is carried on a type of MAC Control Element (MAC CE) that reports the headroom between the current UE transmission (e.g., the estimated power) and the nominal power (e.g., PUSCH power). A BS may use the report value to estimate UL bandwidth allotted to a UE. The UE may transmit the PHR to schedule an available data rate for UL transmission on a shared channel (e.g., UL-SCH). When UEs use more bandwidth, the UE transmission power increases. However, the UE transmission power is limited by a maximum transmission power (e.g., maximum permitted exposure MPE). Accordingly, a UE may not use bandwidth, and a BS may not allocate the UE bandwidth, if the UE does not have enough power headroom.

Three types of PHR may be defined in NR. Type 1 PHR reflects the power headroom assuming PUSCH-only transmission on the carrier. If the device was scheduled for PUSCH transmission during a certain duration, then Type 1 reporting may be employed for various component carriers (CC). Type 1 PHR reporting includes the power headroom and corresponding value of the maximum per-carrier transmit power for a CC. For example, the maximum per-carrier transmit power for CC denoted 'c' is $P_{CMAX}$. Type 1 power headroom may also be reported when there is no actual PUSCH transmission. That is, the power headroom is reported in a default transmission configuration corresponding to the minimum possible resource assignment. Type 2 PHR includes simultaneous PUSCH and Physical Uplink Control Channel (PUCCH) reporting. Type 3 PHR may be used to handle sounding reference signals (SRS) switching. SRS switching may be implemented when SRS are transmitted on an uplink carrier when the STA transmitting the SRS is not configured to transmit PUSCH. Type 3 reporting may be used to evaluate the UL quality of alternate UL carriers. Type 3 reporting may facilitate configuring (or reconfiguring) the UE for the alternate UL carriers.

Figure 4:
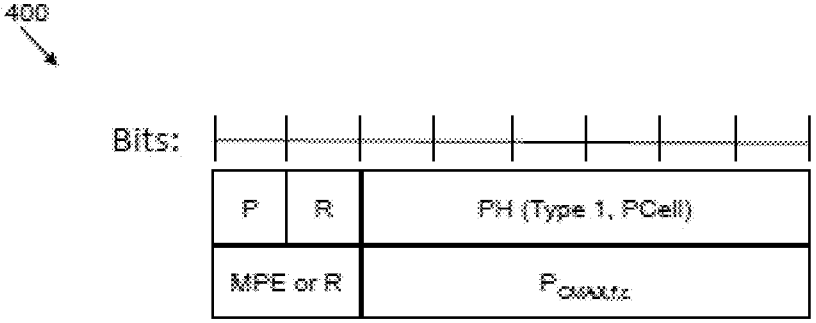
FIG. 4 illustrates an example Single Entry PHR MAC CE format, in accordance with some implementations of the present disclosure.

The UE may transmit the PHR on a Single Entry PHR MAC CE or a Multiple Entry PHR MAC CE depending on the values reported by the physical layer. FIG. 4 illustrates an example Single Entry PHR MAC CE format 400, in accordance with some implementations of the present disclosure. As shown, format 400 indicates a Single Entry PHR MAC CE. In the event of carrier aggregation and/or dual connectivity, multiple PHR may be contained in a single Multiple Entry PHR MAC CE.

Figure 5A:
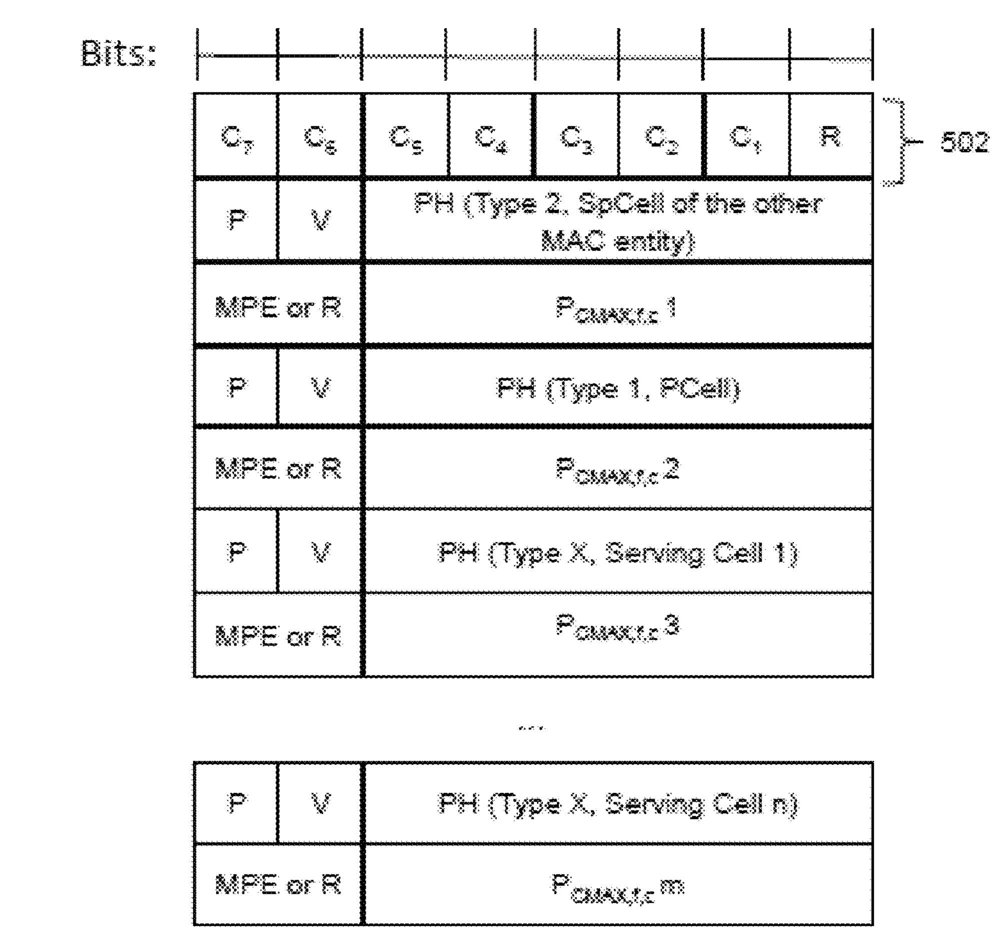
FIGS. 5A and 5B illustrate examples of Multiple Entry PHR MAC CE formats, in accordance with some implementations of the present disclosure.
Figure 5B:
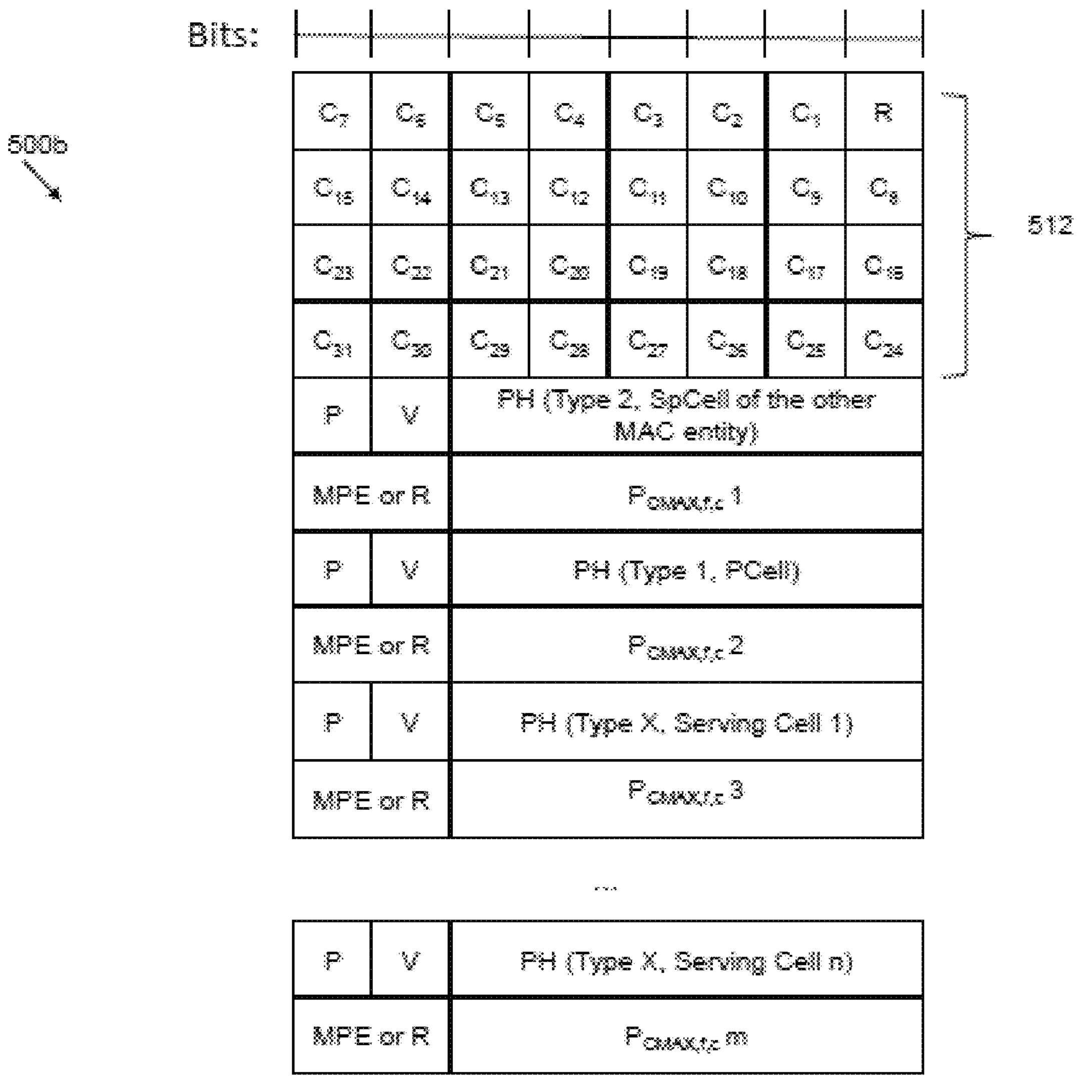

FIGS. 5A and 5B illustrate examples of Multiple Entry PHR MAC CE formats 500*a* and 500*b*, in accordance with some implementations of the present disclosure. In FIG. 5A, format 500*a* illustrates Multiple Entry PHR MAC CE with the ServCellIndex of Serving Cell UL is configured for less than 8 CCs. The CCs are indicated at 502. The serving cell may be the set of one or more cells including the master cell group (MCG) and the secondary cell group (SCG). In FIG. 5B, format 500*b* illustrates Multiple Entry PHR MAC CE with the ServCellIndex of Serving Cell UL is configured for equal to or more than 8 CCs. The CCs are indicated at 512.

Each entry in PHR MAC CE may include at least one of: the power headroom (PH) used to report the power headroom level; "V" used to indicate whether "PH" is based on a real transmission of a reference format; "$C_i$" used to indicate whether the ith CC is reporting "PH"; "P" used to indicate whether MPE is being reported; "$P_{CMAX,f,c}$" used to report the nominal UE transmit power level for carrier f of serving cell c in each slot; "MPE" used to report the measured P-MPR value; and "R" used to report a reserved bit.

Parameters of the PHR may be configured using RRC signalling (e.g., RRC Connection Setup, RRC Connection Reconfiguration) for each TRP. For example, the phr-PeriodicTimer parameter may be used to control the periodicity of the PHR. In the event the timer expires, a PHR may be triggered.

Additionally or alternatively, the phr-ProhibitTimer parameter may be used to control the minimum time between two PHRs. Controlling the time between two PHRs has the effect of controlling the signalling load on the UL transmission. Accordingly, the PHR may be prohibited if the PHR timer is active (e.g., running, counting, ticking). When the phr-ProhibitTimer expires, PHR may be triggered.

Additionally or alternatively, the mpe-ProhibitTimer parameter may be used to control the minimum time between two MPE reporting events. In effect, the MPE prohibit time may signal the load on the UL transmission.

Additionally or alternatively, the phr-Tx-PowerFactorChange parameter may be used to report the difference between the current power headroom and the power headroom in the last report. The PHR may be triggered when the change in the path loss is more than a configured threshold.

Additionally or alternatively, the phr-Type2OtherCell parameter may be used to indicate whether the UE reports a PHR type 2 for the SP cell of the other MAC entity. The other cell group may be the master cell group (MCG) or the secondary cell group (SCG). PHR Type 1 reporting reflects the power headroom assuming PUSCH-only transmissions, while PHR Type 2 reporting assumes combined PUSCH and PUCCH transmission.

Additionally or alternatively, the phr-ModeOtherCG parameter may be used to indicate the mode (e.g., real or virtual) used for the PHR of the activated cells that are part of the other cell groups when dual connectivity (DC) is configured.

Additionally or alternatively, the multiplePHR parameter may be used to indicate whether the PHR is reported in the Single Entry PHR MAC CE or Multiple Entry MAC CE.

Additionally or alternatively, the mpe-Reporting parameter may be used to indicate whether the UE reports MPE P-MPR (power management maximum power reduction) in the PHR MAC CE. PHR reporting may be triggered based on a MPE related event.

Additionally or alternatively, the mpe-Threshold parameter may be used to configure the value of the P-MPR threshold in dB (e.g., reporting MPE P-MPR when FR2 is configured).

Figure 6:
FIG. 6 illustrates an example method of a UE being configured for single DCI based multi-TRP PUSCH repetition based on PHR, in accordance with some implementations of the present disclosure.

FIG. 6 illustrates an example method 600 of a UE being configured for single DCI based multi-TRP PUSCH repetition based on PHR, in accordance with some implementations of the present disclosure. As shown in 602, the UE may receive RRC signaling configuring PHR parameters for UL transmission. A UE may receive RRC signalling configuring PHR parameters for UL transmissions from a BS. The PHR parameters may include at least one of: phr-PeriodicTimer, phr-ProhibitTimer and/or phr-Tx-PowerFactorChange. The UL transmissions may include PUCCH, PUSCH (including PUSCH transmissions, PUSCH repetition, and/or PUSCH occasions) or SRS.

Figure 7:
FIG. 7 illustrates an example method of a BS configuring single DCI based multi-path TRP-PUSCH repetition based on PHR, in accordance with some implementations of the present disclosure.

FIG. 7 illustrates an example method 700 of a BS configuring single DCI based multi-path TRP-PUSCH repetition based on PHR, in accordance with some implementations of the present disclosure. As shown in 702, the BS may transmit RRC signaling that configures PHR parameters for UL transmissions.

The PUSCH(s) (including PUSCH transmissions, PUSCH repetition, and/or PUSCH occasions) associated with the SRS resources from the SRS resource sets may be indicated using a single DCI message in a DCI format (e.g., DCI format 0_1 or DCI format 0_2). The DCI message may indicate SRS resource sets associated with the UL transmission. In some configurations, the DCI message may include an indicator indicating the SRS resource set. The indicator may include a SRS Resource Indicator (SRI) or a transmitted precoding matrix indicator (TPMI) when a parameter txConfig in PUSCH-Config is set to codebook or an SRI when a parameter in txConfig in PUSCH-Config is set to non-codebook.

The SRS resource sets may indicate the first and second configured parameter sets of PHR for PUSCH(s). That is, PHR parameter sets may be associated with one or more SRS resource sets. Each PHR parameter set may include at least one of: a periodic timer of PHR, a prohibit timer of PHR, and/or a value of changed power of path loss. Accordingly, in some configurations, a first periodic timer of PHR, a first prohibit timer of PHR, and a first value of changed power of path in a first PHR parameter set may be associated with a first SRS resource set. Further, a second periodic timer of PHR, a second prohibit timer of PHR, and a second value of changed power of path loss in a second PHR parameter set may be associated with a second SRS resource set. In an example, the PHR parameters of the second PHR parameter set may be denoted by phr-PeriodicTimer2, phr-ProhibitTimer2 and/or phr-Tx-PowerFactorChange2.

In some configurations, the UE may transmit a PHR MAC CE carrying power related measurements (e.g., PH, MPE, $P_{CMAX}$) for UL transmissions to a BS. The reported values of fields in the PHR MAC CE may also include R, P, and V information as discussed herein (e.g., indicating reserved bits, whether MPE is being reported, and whether PH is based on a real transmission or a reference respectively). As discussed herein, UL transmissions may include PUCCH, PUSCH (e.g., including PUSCH transmissions, PUSCH repetition, and/or PUSCH occasions) or SRS.

The PHR MAC CE may include a number of entries, where each entry has a field with a value indicating an association with SRS resource sets (e.g., SRS resource sets that may be associated with PHR parameter sets). That is, a single entry may be associated with one SRS resource set. The association of entries in the PHR MAC CE to SRS resource sets may be repeatedly carried on the PUSCH transmissions and PUSCH repetitions. That is, the UE may repeat the UL transmission carrying the PHR MAC CE to the BS.

Figure 8:
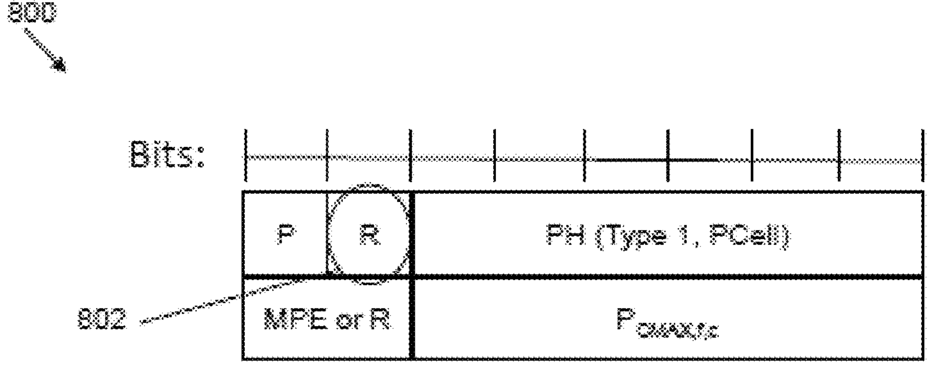
FIG. 8 illustrates an example of Single Entry MAC CE format, in accordance with some implementations of the present disclosure.

FIG. 8 illustrates an example of Single Entry MAC CE format 800, in accordance with some implementations of the present disclosure. As shown in format 800, the bit indicated by 802 may be used to indicate the PHR MAC CE's association with an SRS resource set. In an example configuration, if the bit in the R field is set to 0, the PHR MAC CE may be associated with a first SRS resource set. If the bit in the R field is set to 1, the PHR MAC CE may be associated with a second SRS resource set. The Single Entry MAC CE format may include a single entry with a field (e.g., reserved bit 802) with a value indicating an association with a particular SRS field.

Additionally or alternatively, the PHR MAC CE may include a number of entries, where a first entry has a field with a value indicating an association with a first SRS resource set, and a second entry has a field with a value indicating an association with a second SRS resource set. That is, a multiple entries (e.g., two entries) in a PHR MAC CE may correspond to two SRS resources sets. The association of entries in the PHR MAC CE to SRS resource set may be repeatedly carried on the PUSCH transmissions and PUSCH repetitions.

Figure 9:
FIG. 9 illustrates an example of Multiple Entry MAC CE format, in accordance with some implementations of the present disclosure.
Figure 9:
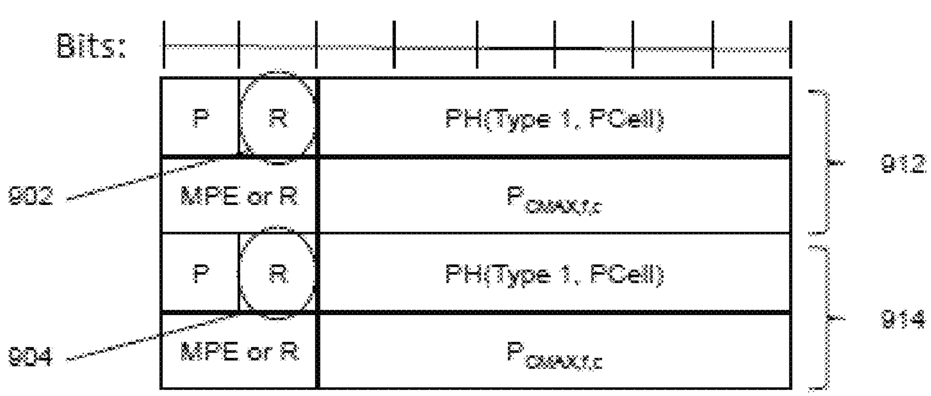

FIG. 9 illustrates an example of Multiple Entry MAC CE format 900, in accordance with some implementations of the present disclosure. As shown, the bits indicated by 902 and 904 may be used to indicate the PHR MAC CE's association with SRS resource sets. In an example configuration, if the bit in an R field (e.g., 902 or 904) is set to 0, the PHR MAC CE may be associated with a first SRS resource set. If the bit in the R field (e.g., 902 or 904) is set to 1, the PHR MAC CE may be associated with a second SRS resource set. In some configurations, the value of the R field in 902 may be different from the value of the R field in 904. That is, the first PHR MAC CE entry 912 may be associated with a first SRS resource set, and the second PHR MAC CE entry 914 may be associated with a second SRS resource set.

Figure 10A:
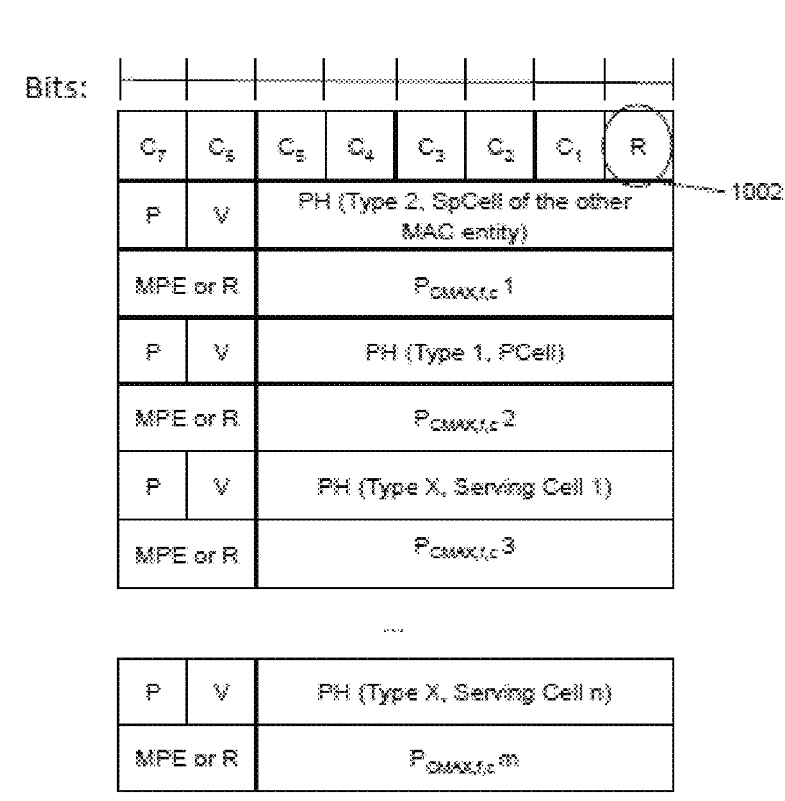
FIGS. 10A and 10B illustrate examples of Multiple Entry PHR MAC CE formats indicating an association between SRS resource sets and multiple CCs, in accordance with some implementations of the present disclosure.
Figure 10B:
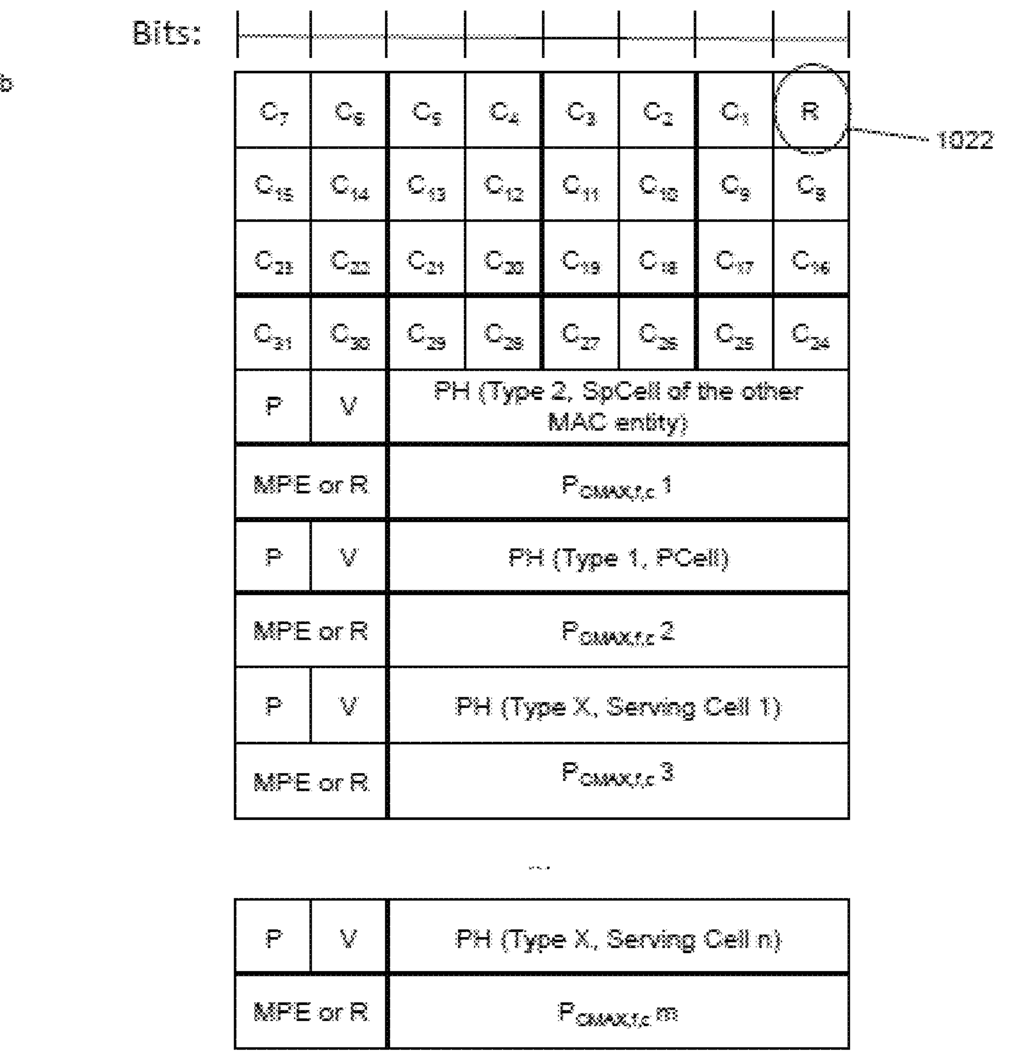

The association between the same indices of the SRS resource set and multiple CCs may be indicated by the "R" field in the first octet in the Multiple Entry PHR MAC CE. FIGS. 10A and 10B illustrate examples of Multiple Entry PHR MAC CE formats 1000*a* and 1000*b* indicating an association between SRS resource sets and multiple CCs, in accordance with some implementations of the present disclosure. In FIG. 10A, format 1100*a* illustrates Multiple Entry PHR MAC CE with the ServCellIndex of Serving Cell UL configured for less than 8 CCs. The R field 1002 may be set to 0 or 1. The value of the R field 1002 may associate a first or second SRS resource set with multiple CCs. For example, if R is set to 0, then a first SRS resource set may be associated with multiple CCs. If R is set to 1, then a second SRS resource set may be associated with multiple CCs. In FIG. 10B, format 1000*b* illustrates Multiple Entry PHR MAC CE with the ServCellIndex of Serving Cell UL configured for more than 8 CCs. The R field 1022 may be set to 0 or 1. The value of the R field 1022 may associate a first or second SRS resource set with multiple CCs. For example, if R is set to 0, then a first SRS resource set may be associated with multiple CCs. If R is set to 1, then a second SRS resource set may be associated with multiple CCs.

In some configurations, a UE may transmit PHR MAC CE with various entries to a BS based on RRC signalling configurations received from the BS. That is, the UE may receive from the BS RRC signalling indicating CC related information. The UE may transmit a MAC CE carrying power related measurements to the BS (e.g., PH, MPE, $P_{CMAX}$). The reported values of fields in the MAC CE may also include R, P, and V information as discussed herein (e.g., indicating reserved bits, whether MPE is being reported, and whether PH is based on a real transmission or a reference respectively). The fields in the MAC CE (e.g., the PH measurements) may be associated with SRS resource sets.

The RRC configurations received from the BS may include a number of CCs where PHR is reported. The CCs may be CCs of a serving cell or an active UL bandwidth part (BWP) of a carrier of a serving cell. The RRC configurations may also include a number of SRS resource sets per CC. The SRS resource sets may be configured per CC and/or per UL BWP. The number of SRS resource sets in each CC (or each UL BWP) and the number of SRS resource sets in the SRS resource set may be different.

In some configurations, during Multi-Radio Dual Connectivity (MR-DC) or UL Carrier Aggregation (CA), the UE may transmit PUSCH transmission (or PUSCH repetitions or PUSCH occasions) scheduled according to a single DCI associated with SRS resources from two SRS resource sets. The DCI message may be DCI format 0_1 or DCI format 0_2.

The PUSCH transmissions (or PUSCH repetitions or PUSCH occasions) in an active UL BWP of a serving cell may repeatedly carry Multiple Entry PHR MAC CE. In some configurations, the Multiple Entry PHR MAC CE may include all of the information of PHR for multiple CCS associated with a same index of the SRS resource set. In other configurations, the Multiple Entry PHR MAC CE may include multiple PHs for multiple CCs associated with the first and second SRS resource set. The PH values in PHR for multiple CCs may be based on a real transmission or a reference format.

The number of PH values (m) may be equal to $$\sum_{i=1}^{c} CC_i \times N_i.$$

In the expression, $CC_i$ represents a CC including a reported PH, $N_i$ represents a number of SRS resource sets per CC that include a reported PH, and c represents a number of CCs including the PHs. In the event the higher layer parameter phr-Type2OtherCell indicates a "true" value, the CCs may include the CCs in an SP cell.

Figure 11A:
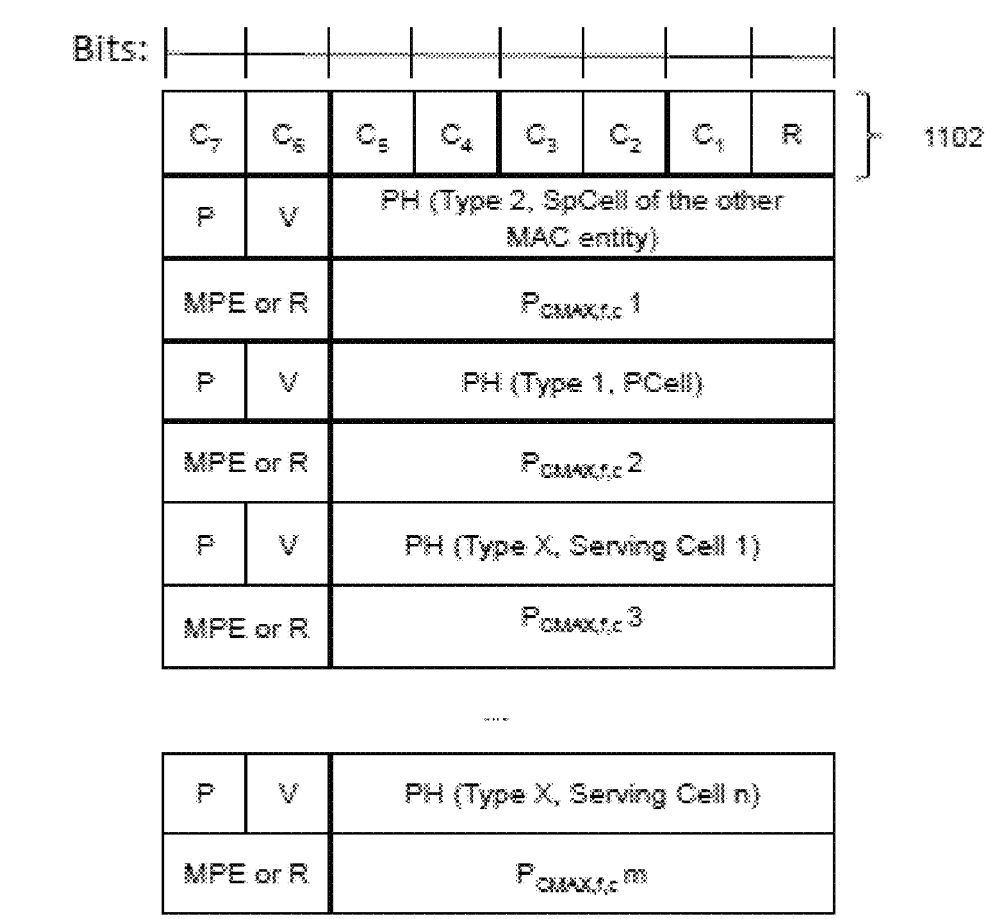
FIGS. 11A-11C illustrates examples of Multiple Entry PHR MAC CE formats, in accordance with some implementations of the present disclosure.
Figure 11B:
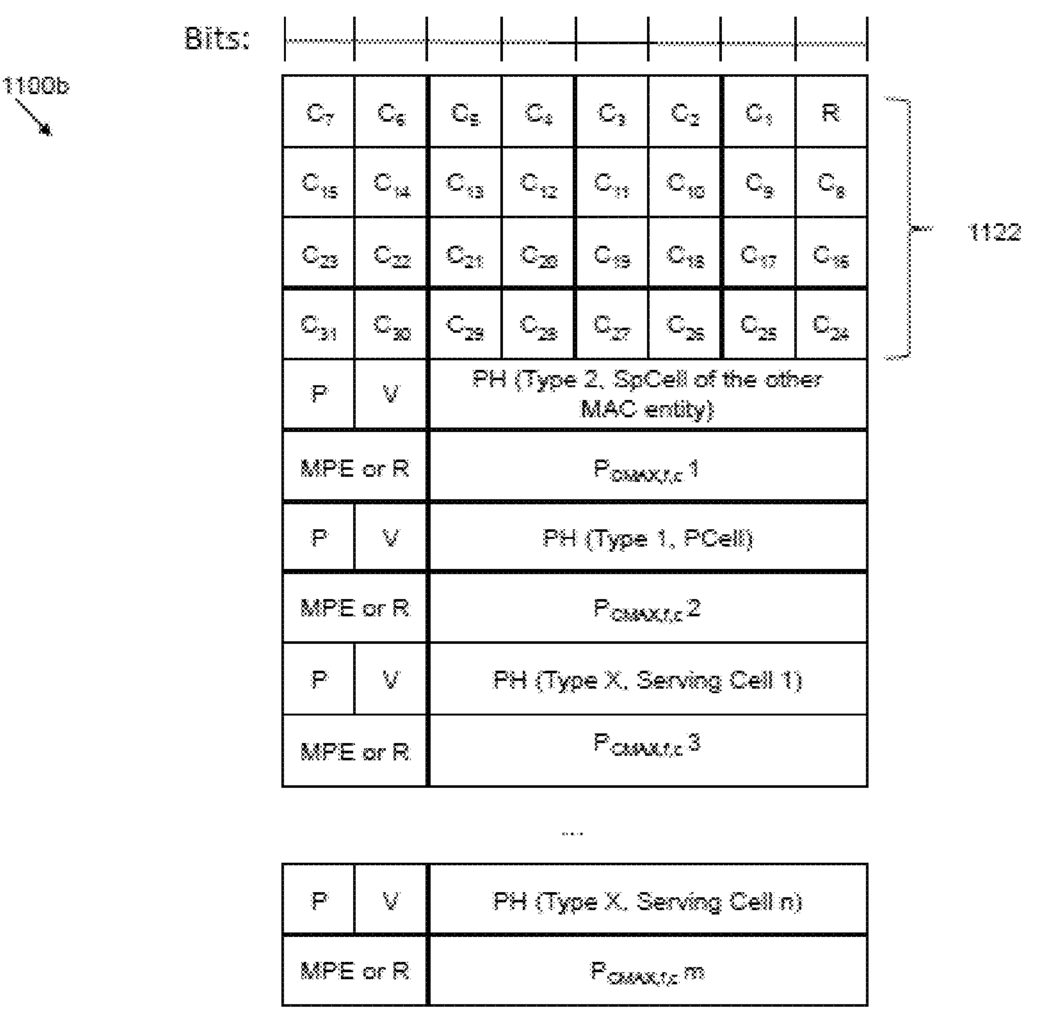
Figure 11C:
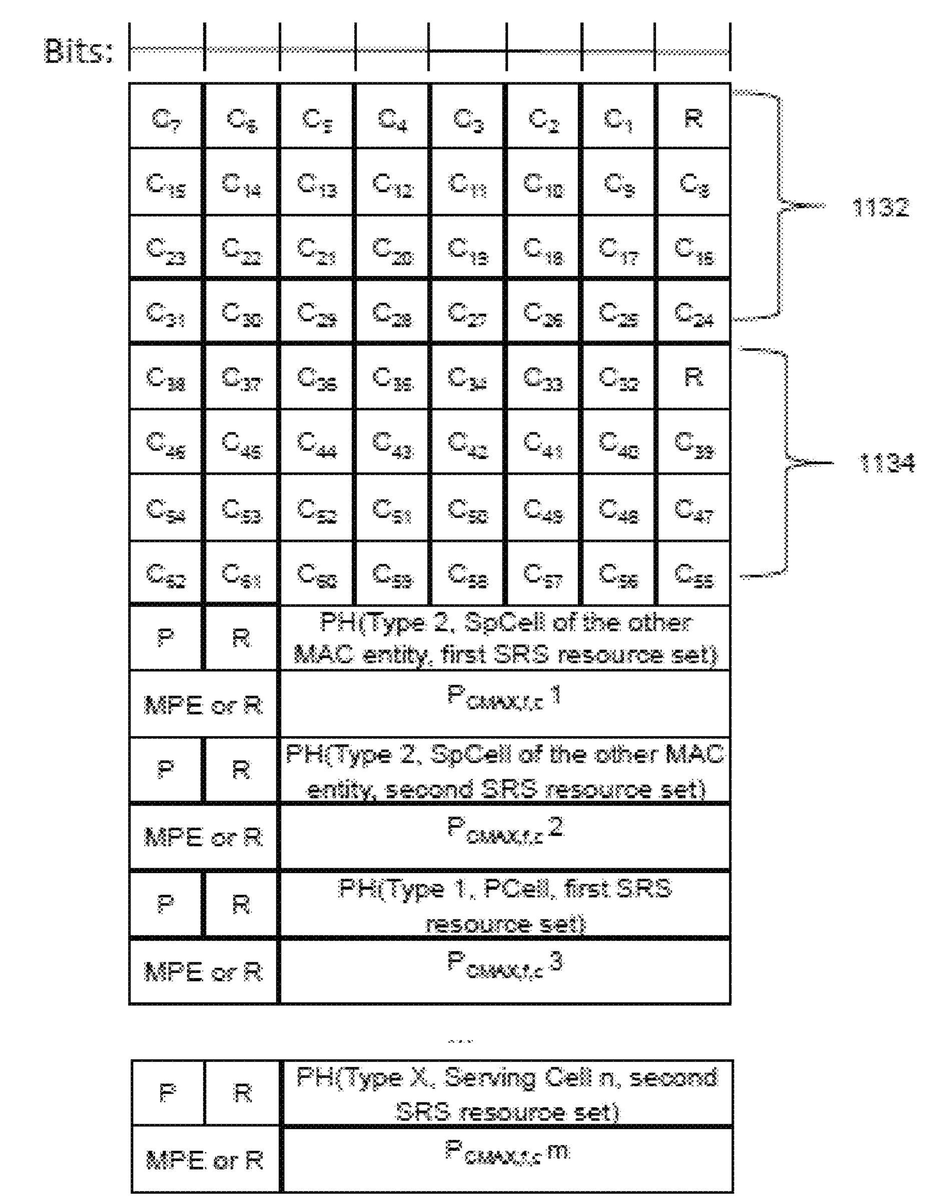

FIGS. 11A-11C illustrates examples of Multiple Entry PHR MAC CE formats 1100*a*-1100*c*, in accordance with some implementations of the present disclosure. The Multiple Entry PHR MAC CE formats 1100*a*-1100*c* may be used to report the multiple PHs on PUSCH transmissions (or PUSCH repetitions or PUSCH occasions).

In FIG. 11A, format 1100*a* illustrates the ServCellIndex of Serving Cell UL configured for less than 8 CCs. The CCs are indicated by 1102. If the value of m is less than 8, then the sequence of the report entry for multiple PHs may be one at a time. That is, the PHs may be reported using the PHR MAC CE configured to indicate up to 7 CCs. If the value of m is greater than or equal to 8, then the first 7 PHs may be transmitted in a first Multiple Entry PHR MAC CE. The remaining PHs may be transmitted in following Multiple Entry PHR MAC CE, where the sequence of the report entry for multiple PHs may be one at a time. That is, the first 7 PHs may be reported using a PHR MAC CE on a first PUSCH transmission (or PUSCH repetitions or PUSCH occasions) configured to report up to 7 CCs. The remaining PHs may be reported using a next PHR MAC CE on a second PUSCH transmission (or PUSCH repetition or PUSCH occasion) configured to report up to 7 CCs.

In FIG. 11B, format 1100*b* illustrates Multiple Entry PHR MAC CE with the ServCellIndex of Serving Cell UL is configured for more than 8 CCs and less than 32 CCs. The CCs are indicated by 1122. If the value of m is greater than or equal to 8 and less than 32, then the sequence of the report entry for multiple PHs may be one at a time. That is, the PHs may be reported using a MAC CE configured to indicate up to 31 CCs. If the value of m is less than 32, then the sequence of the report entry for multiple PHs may be one at a time. That is, PHs may be reported using a MAC CE that is configured to indicate up to 31 CCs. If the value of m is greater than or equal to 31, then the first 31 PHs may be transmitted in a first Multiple Entry PHR MAC CE. The remaining PHs may be transmitted in following Multiple Entry PHR MAC CE, where the sequence of the report entry for multiple PHs may be one at a time. That is, the first 31 PHs may be reported using a PHR MAC CE on a first PUSCH transmission (or PUSCH repetitions or PUSCH occasions) configured to report up to 31 CCs. The remaining PHs may be reported using a next PHR MAC CE on a second PUSCH transmission (or PUSCH repetition or PUSCH occasion) configured to report up to 31 CCs.

In FIG. 11C, format 1100*c* illustrates Multiple Entry PHR MAC CE with the ServCellIndex of Serving Cell UL is configured for more than 8 CCs. The CCs are indicated by 1132 and 1134. If the value of m is less than 32, then the sequence of the report entry for multiple PHs may be one at a time. If the value of m is greater than or equal to 32, then the first 31 PHs may be reported in a first Multiple Entry PHR MAC CE configured to report up to 31 CCs. The remaining PHs may be transmitted in the following Multiple Entry PHR MAC CE, where the sequence of the report entry for multiple PHs may be one at a time. That is, the first 31 PHs may be reported using a PHR MAC CE on a first PUSCH transmission (or PUSCH repetitions or PUSCH occasions) configured to report up to 31 CCs. The remaining PHs may be reported using a next PHR MAC CE on a second PUSCH transmission (or PUSCH repetition or PUSCH occasion) configured to report up to 31 CCs.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:

receiving, by a wireless communication device from at least one wireless communication node in a plurality of wireless communication nodes, a first radio resource control (RRC) signalling configuring a plurality of power headroom reporting (PHR) parameters for uplink transmission specific to a respective wireless communication node in the plurality of wireless communication nodes, wherein one or more of the plurality of PHR parameters are specifically associated with a first sounding reference signal (SRS) resource set of a plurality of SRS resource sets; and repeating, by the wireless communication device to the at least one wireless communication node in the plurality of wireless communication nodes, the uplink transmission carrying a medium access control control element (MAC CE), the MAC CE including a plurality of power related measurements and a field indicating an association between the MAC CE and one of the plurality of SRS resource sets.

2. The method of claim 1, wherein the uplink transmission includes at least one of: a physical uplink shared channel (PUSCH) transmission, a PUSCH repetition, or a PUSCH occasion.

3. The method of claim 1, comprising receiving, by the wireless communication device from the at least one wireless communication node, a single downlink control information (DCI) message indicating one of the plurality of SRS resource sets that is associated with the uplink transmission.

4. The method of claim 3, wherein the DCI message includes an indicator indicating the SRS resource set, the indicator including one of: a SRS Resource Indicator (SRI) or a Transmitted Precoding Matrix Indicator (TPMI) when a parameter txConfig in PUSCH-Config is set to codebook, or an SRI when a parameter txConfig in PUSCH-Config is set to non-codebook.

5. The method of claim 3, wherein the DCI message includes at least one of: a DCI format 0_1 or a DCI format 0_2.

6. The method of claim 1, wherein the plurality of PHR parameters include at least one of: a periodic timer of PHR, a prohibit timer of PHR, or a value of changed power of path loss.

7. The method of claim 1, wherein the plurality of PHR parameters include:

a first periodic timer of PHR, a first prohibit timer of PHR, and a first value of changed power of path loss that are associated with the first SRS resource set; and a second periodic timer of PHR, a second prohibit timer of PHR, and a second value of changed power of path loss that are associated with a second one of the plurality of SRS resource sets.

8. The method of claim 1, wherein the plurality of PHR parameters include a first PHR parameter set and a second PHR parameter set that are associated with the first SRS resource set and the second SRS resource set, respectively, wherein each of the first and second PHR parameter sets includes at least one of: a periodic timer of PHR, a prohibit timer of PHR, or a value of changed power of path loss.

9. The method of claim 1, wherein the MAC CE includes a plurality of entries, each entry having a field with a value indicating its association with the SRS resource set or another one of the plurality of SRS resource sets.

10. The method of claim 1, wherein the MAC CE includes a plurality of entries, a first one of the entries associated with the first SRS resource set, and a second one of the entries associated with a second one of the SRS resource sets.

11. The method of claim 1, wherein the MAC CE consists essentially of a single entry that is associated with the first SRS resource set.

12. The method of claim 11, wherein the single entry has the field with a value indicating the association with the first SRS resource set.

13. The method of claim 1, wherein repeating the uplink transmission further comprises repeating the uplink transmission carrying the same MAC CE to the at least one wireless communication node.

14. The method of claim 1, further comprising:

receiving, by the at least one wireless communication device from the wireless communication node in the plurality of wireless communication nodes, a second RRC signalling indicating component carrier (CC)-related information; and transmitting, by the wireless communication device to the at least one wireless communication node in the plurality of wireless communication nodes, based on the second RRC signalling, a second MAC CE carrying a plurality of power-related measurements, wherein the second MAC CE includes a plurality of entries.

15. The method of claim 14, wherein the MAC CE includes a plurality of Power Headroom (PH) measurements associated with the plurality of SRS resource sets.

16. The method of claim 15, wherein a number of the PH measurements (m) is determined based on following expression:

$$\sum_{i=1}^{c} CC_i \times N_i,$$

where $CC_i$ represents one of a plurality of CCs including one of the PHs reported, c represents a number of the CCs including the PHs, and $N_i$ represents a number of SRS resource sets per CC that includes one of the PHs reported.

17. A wireless communication device, comprising:

at least one processor configured to:

receive, via a receiver from at least one wireless communication node in a plurality of wireless communication nodes, a first radio resource control (RRC) signalling configuring a plurality of power headroom reporting (PHR) parameters for uplink transmission specific to a respective wireless communication node in the plurality of wireless communication nodes, wherein one or more of the plurality of PHR parameters are specifically associated with a first sounding reference signal (SRS) resource set of a plurality of SRS resource sets; and repeat, for the at least one wireless communication node in the plurality of wireless communication nodes, the uplink transmission carrying a medium access control control element (MAC CE), the MAC CE including a plurality of power related measurements and a field indicating an association between the MAC CE and one of the plurality of SRS resource sets.

18. A wireless communication method, comprising:

transmitting, by at least one wireless communication node to a wireless communication device in a plurality of wireless communication nodes, a first radio resource control (RRC) signalling configuring a plurality of power headroom reporting (PHR) parameters for uplink transmission specific to a respective wireless communication node in the plurality of wireless communication nodes, wherein one or more of the plurality of PHR parameters are specifically associated with a first sounding reference signal (SRS) resource set of a plurality of SRS resource sets, wherein the wireless communication device repeats the uplink transmission carrying a medium access control control element (MAC CE), the MAC CE including a plurality of power related measurements and a field indicating an association between the MAC CE and one of the plurality of SRS resource sets.

19. A wireless communication node, comprising:

at least one processor configured to:

transmit, via a transmitter to a wireless communication device, a first radio resource control (RRC) signalling configuring a plurality of power headroom reporting (PHR) parameters for uplink transmission specific to a respective wireless communication node in the plurality of wireless communication nodes, wherein one or more of the plurality of PHR parameters are specifically associated with a first sounding reference signal (SRS) resource set of a plurality of SRS resource sets, wherein the wireless communication device repeats the uplink transmission carrying a medium access control control element (MAC CE), the MAC CE including a plurality of power related measurements and a field indicating an association between the MAC CE and one of the plurality of SRS resource sets.

* * * * *